United States Patent
Stacey et al.

(10) Patent No.: US 10,089,308 B1
(45) Date of Patent: *Oct. 2, 2018

(54) METHOD FOR USING REDUNDANT DATA ELIMINATION TO ACCELERATE STORAGE SYSTEM SCANNING

(75) Inventors: Christopher H. E. Stacey, Christchurch (NZ); John Cardente, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1233 days.

This patent is subject to a terminal disclaimer.

(21) Appl. No.: 12/241,531

(22) Filed: Sep. 30, 2008

(51) Int. Cl.
*G06F 7/00* (2006.01)
*G06F 17/30* (2006.01)

(52) U.S. Cl.
CPC .............. *G06F 17/30011* (2013.01)

(58) Field of Classification Search
CPC .................................................. G06F 17/2211
USPC ........... 707/636, 652, 999.102, 999.104, 783
See application file for complete search history.

(56) References Cited

U.S. PATENT DOCUMENTS

| | | | |
|---|---|---|---|
| 5,206,939 A | | 4/1993 | Yanai et al. |
| 5,632,012 A | * | 5/1997 | Belsan et al. ................ 714/6.12 |
| 5,778,394 A | | 7/1998 | Galtzur et al. |
| 5,809,494 A | * | 9/1998 | Nguyen ............ G06F 17/30949 |
| 5,813,009 A | * | 9/1998 | Johnson et al. .............. 707/695 |
| 5,845,147 A | | 12/1998 | Vishlitzky et al. |
| 5,857,208 A | | 1/1999 | Ofek |
| 6,704,730 B2 | | 3/2004 | Moulton et al. |
| 6,826,711 B2 | | 11/2004 | Moulton et al. |
| 7,024,512 B1 | * | 4/2006 | Franaszek ............. G06F 12/023 704/500 |
| 7,062,648 B2 | | 6/2006 | Moulton et al. |
| 7,194,504 B2 | | 3/2007 | Moulton |
| 7,340,461 B2 | | 3/2008 | Vishlitzky et al. |
| 7,672,962 B2 | * | 3/2010 | Arrouye ............ G06F 17/30979 707/999.101 |
| 7,689,633 B1 | * | 3/2010 | Li ..................... G06F 17/30067 707/821 |

(Continued)

OTHER PUBLICATIONS

U.S. Appl. No. 11/903,869, filed Sep. 25, 2007, Veprinsky et al.

*Primary Examiner* — Eliyah S Harper
(74) *Attorney, Agent, or Firm* — Muirhead and Saturnelli, LLC

(57) ABSTRACT

Embodiments are directed to methods and apparatus for making available to at least one scanning tool, information about at least one data unit shared among multiple storage objects of a plurality of storage objects stored on a storage system. The at least one scanning tool can use the information to influence at least one scanning operation on the at least some of the plurality of storage objects. Embodiments may be implemented in a computer system comprising at least one application program, at least one mapping layer that makes available to the at least one application program a plurality of storage objects, and a storage system that stores data in each of the plurality of storage objects in one or more data units. The at least one computer system further comprises the at least one scanning tool that performs the at least one scanning operation on at least some of the plurality of storage objects, and at least one redundant data elimination tool that eliminates at least some redundant data by sharing at least one of the data units among multiple storage objects.

16 Claims, 8 Drawing Sheets

(56) References Cited

U.S. PATENT DOCUMENTS

| | | | |
|---|---|---|---|
| 7,693,856 B2 * | 4/2010 | Arrouye | G06F 17/30979 |
| | | | 707/999.101 |
| 7,747,581 B1 * | 6/2010 | Li | G06F 17/30067 |
| | | | 707/686 |
| 8,156,082 B2 * | 4/2012 | Srivastava | G06F 17/30575 |
| | | | 707/609 |
| 2001/0034795 A1 | 10/2001 | Moulton et al. | |
| 2005/0203920 A1 * | 9/2005 | Deng | G06F 17/30292 |
| 2005/0203930 A1 * | 9/2005 | Bukowski | G06F 17/30241 |
| 2007/0106647 A1 * | 5/2007 | Schwalb | G06F 17/30011 |
| | | | 705/314 |
| 2007/0112809 A1 * | 5/2007 | Arrouye | G06F 17/30979 |
| 2008/0086480 A1 * | 4/2008 | Srivastava | G06F 17/30575 |
| 2009/0198742 A1 * | 8/2009 | Borissov | G06F 8/60 |
| 2009/0287901 A1 * | 11/2009 | Abali et al. | 711/206 |

\* cited by examiner

METHOD FOR USING REDUNDANT DATA ELIMINATION TO ACCELERATE STORAGE SYSTEM SCANNING

TECHNICAL FIELD

The present invention relates generally to scanning storage system data, and more particularly to using information about the impact of redundant data elimination to inform the scanning process.

BACKGROUND

Scanning tools exist that scan the data on a storage system for a variety of purposes including, anti-virus processing, keyword based file classification, security audits, and others. In many computer system environments, a file system, logical volume manager, database and/or other mapping layer provides an interface between the data units on a storage system and one or more clients that access the data, so that the data is accessed by clients in the form of logical storage objects (e.g., files, logical volumes, database records) rather than having the client directly access the data units in the storage system. Scanning tools typically examine the data stored on the storage system in logical objects presented to one or more clients. For example, in a computer system including a file system, a scanning tool may scan files in the file system and examine file system metadata associated with a file to determine the identity and location of the file's data units stored on the storage system.

Some computer systems may implement data reduction methods to reduce the amount of storage required to store data units. An example of a data reduction method is redundant data elimination (RDE), sometimes also known as data deduplication. RDE is a technique that allows a data unit (e.g., data block, etc.) shared by multiple storage objects to be stored fewer times on physical storage than the number of logical objects that share the data unit. Systems employing RDE typically accomplish this through the use of mapping tables that translate object contents into references to a shared data unit. Such data reduction methods are generally implemented in such a way as to be transparent to client systems, thereby preserving conventional storage system behavior.

SUMMARY

One illustrative embodiment is directed to a method for use in a computer system comprising at least one application program, at least one mapping layer that makes available to the at least one application program a plurality of storage objects, and a storage system that stores data in each of the plurality of storage objects in one or more data units, the at least one computer system further comprising at least one scanning tool that performs at least one scanning operation on at least some of the plurality of storage objects, the computer system further comprising at least one redundant data elimination tool that eliminates at least some redundant data by sharing at least one of the data units among multiple storage objects. The method comprises an act of making available to the at least one scanning tool information about the at least one of the data units shared among multiple storage objects so that the at least one scanning tool can use the information to influence the at least one scanning operation on the at least some of the plurality of storage objects.

Another illustrative embodiment is directed to at least one computer readable medium encoded with a plurality of instructions that, when executed, perform a method for use in a computer system comprising at least one application program, at least one mapping layer that makes available to the at least one application program a plurality of storage objects, and a storage system that stores data in each of the plurality of storage objects in one or more data units, the at least one computer system further comprising at least one scanning tool that performs at least one scanning operation on at least some of the plurality of storage objects, the computer system further comprising at least one redundant data elimination tool that eliminates at least some redundant data by sharing at least one of the data units among multiple storage objects. The method comprises an act of making available to the at least one scanning tool information about the at least one of the data units shared among multiple storage objects so that the at least one scanning tool can use the information to influence the at least one scanning operation on the at least some of the plurality of storage objects.

A further illustrative embodiment is directed to at least one computer for use in a computer system comprising at least one application program, at least one mapping layer that makes available to the at least one application program a plurality of storage objects, and a storage system that stores data in each of the plurality of storage objects in one or more data units, the at least one computer system further comprising at least one scanning tool that performs at least one scanning operation on at least some of the plurality of storage objects, the computer system further comprising at least one redundant data elimination tool that eliminates at least some redundant data by sharing at least one of the data units among multiple storage objects. The at least one computer comprises at least one processor programmed to make available to the at least one scanning tool information about the at least one of the data units shared among multiple storage objects so that the at least one scanning tool can use the information to influence the at least one scanning operation on the at least some of the plurality of storage objects.

BRIEF DESCRIPTION OF THE DRAWINGS

Aspects of the invention are described with reference to illustrative embodiments and the following drawings in which like reference characters represent like elements, and wherein.

DETAILED DESCRIPTION

Figure 1:
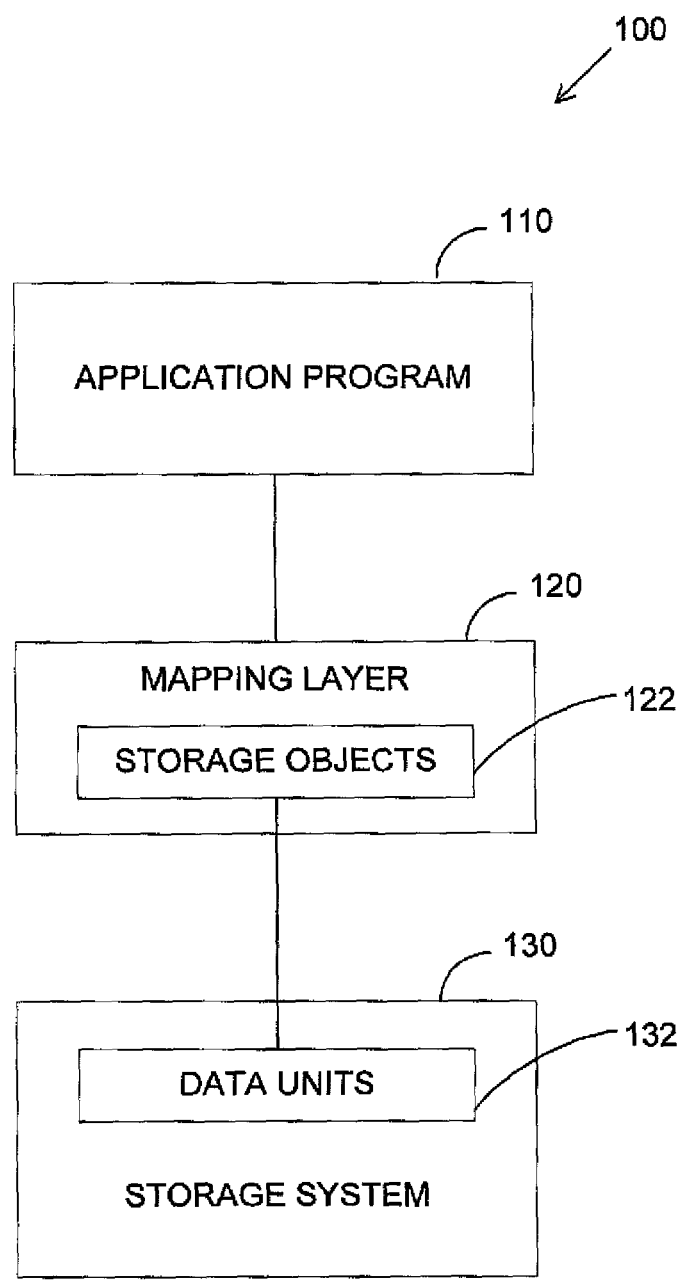
FIG. 1 is a block diagram of the functional components of a computer system on which embodiments of the present invention may be implemented.

As described above, conventional scanning tools scan the data on a storage system by operating on logical storage objects presented to one or more clients by a file system or other mapping layer (e.g., by scanning the contents of each file in a file system). Applicants have appreciated that where the underlying data is stored in a space reduced form on a storage system such that a data unit shared by multiple logical storage objects (e.g., files) is stored only once (e.g., by using aforementioned RDE techniques), such scans are inefficient in that data units that are shared or referenced multiple times are unnecessarily scanned multiple times, once for each storage object (e.g., file) that references the data unit. Thus, applicants have recognized and appreciated that the scanning of a set of storage objects (e.g., a file system) may be improved by providing information to a scanning tool regarding the space reduced form of at least some of the underlying data stored on the storage system. By exposing or transmitting information about the underlying space reduced form of the data to the scanning tool, shared data units stored on the storage system only need to be scanned once. That is, in contrast to a conventional scan in which shared data units are scanned multiple times, in one embodiment of the present invention, data units which are shared by multiple storage objects (e.g., files) are only scanned once, thereby improving the efficiency of the scanning operation.

Redundant data in a storage system may be identified using various approaches. For example, in a "Full File" RDE algorithm, hash signatures of entire files may be compared for similarity, and the data units for identical files may be stored only once on the storage system. Alternatively, hash signatures of data fragments (e.g., data block components of a file) may be compared, and multiple instances of identical data fragments may be stored only once on the storage system. Some RDE algorithms may compare data fragments of a fixed size (e.g., 8 k blocks), whereas other RDE algorithms may compare data fragments having a variable size or alignment using chunking algorithms such as the Rabin Fingerprinting algorithm. Use of a Full File RDE algorithm results in the data units for identical files being reduced to a single instance, whereas Partial File RDE algorithms result in redundant data being reduced to a single instance regardless of the similarity of the files containing the redundant data.

It should be appreciated that these types of RDE tools are described merely for the purpose of illustration, as aspects of the present invention described herein are not limited to use with RDE tools of this or any other type, and can be used with any RDE tool, including those that operate on types of storage objects other than files.

As mentioned above, in accordance with some embodiments of the invention, information related to data units that are shared by multiple storage objects are provided to a scanning tool to improve efficiency of a scanning operation. It should be appreciated that aspects of the present invention described herein can be used with systems that identify shared data units of any type, size, or level of granularity. In accordance with one embodiment of the invention, a data unit shared by multiple storage objects may be a block of storage maintained by the storage system, but it should be appreciated that aspects of the present invention described herein are not limited in this respect, and can used for systems that identify shared data units of any type.

As mentioned above, in accordance with one embodiment with the present invention, information about one or more data units shared among multiple storage objects is made available to the scanning tool to facilitate a scanning operation. It should be appreciated that the making available of such information can be performed by the RDE tool or other components in a computer system that retain information about shared data units (e.g., a file system or other mapping layer), and can also be considered to be performed by the scanning tool itself, as configuring a scanning tool to receive such information makes that information available to the scanning tool.

It should be appreciated that the aspects of the present invention described below can be employed with systems that employ any type of scanning tool (including those that perform any of the types of scans discussed above or others). In some of the examples discussed below, the scanning tool operates on all or a subset of the files presented by a file system. However, it should be appreciated that the aspects of the present invention described herein are not limited to use with the scanning of files in a file system, and can be employed in connection with systems that include other types of storage objects presented by other types of mapping layers, including any of the examples discussed above or others. Similarly, the aspects of the present invention described herein can be used with systems that employ any type of redundant data elimination tool.

An exemplary computer system 100 on which embodiments of the present invention may be implemented is schematically illustrated in FIG. 1. Computer system 100 comprises at least one application program 110, and at least one mapping layer 120 that makes available to the application program 110 a plurality of storage objects 122. As mentioned above, in some illustrative embodiments described below, storage objects 122 are files and the mapping layer 120 is a file system, but the aspects of the present invention described herein are not limited in this respect and can be used with any other types of storage objects and mapping layers. The computer system 100 further comprises a storage system 130 that stores the data in each of the plurality of storage objects 122 as one or more data units 132. The storage system may be of any type (e.g., a disk drive, storage system, or other type) as the aspects of the present invention described herein are not limited for use of any particular type of storage system. Similarly, as discussed above, the data units 132 may be of any type (e.g., data blocks in a file, storage array, or other) as the aspects of the present invention described herein are not limited for use with storage systems that store data in any particular type of data unit.

Figure 2:
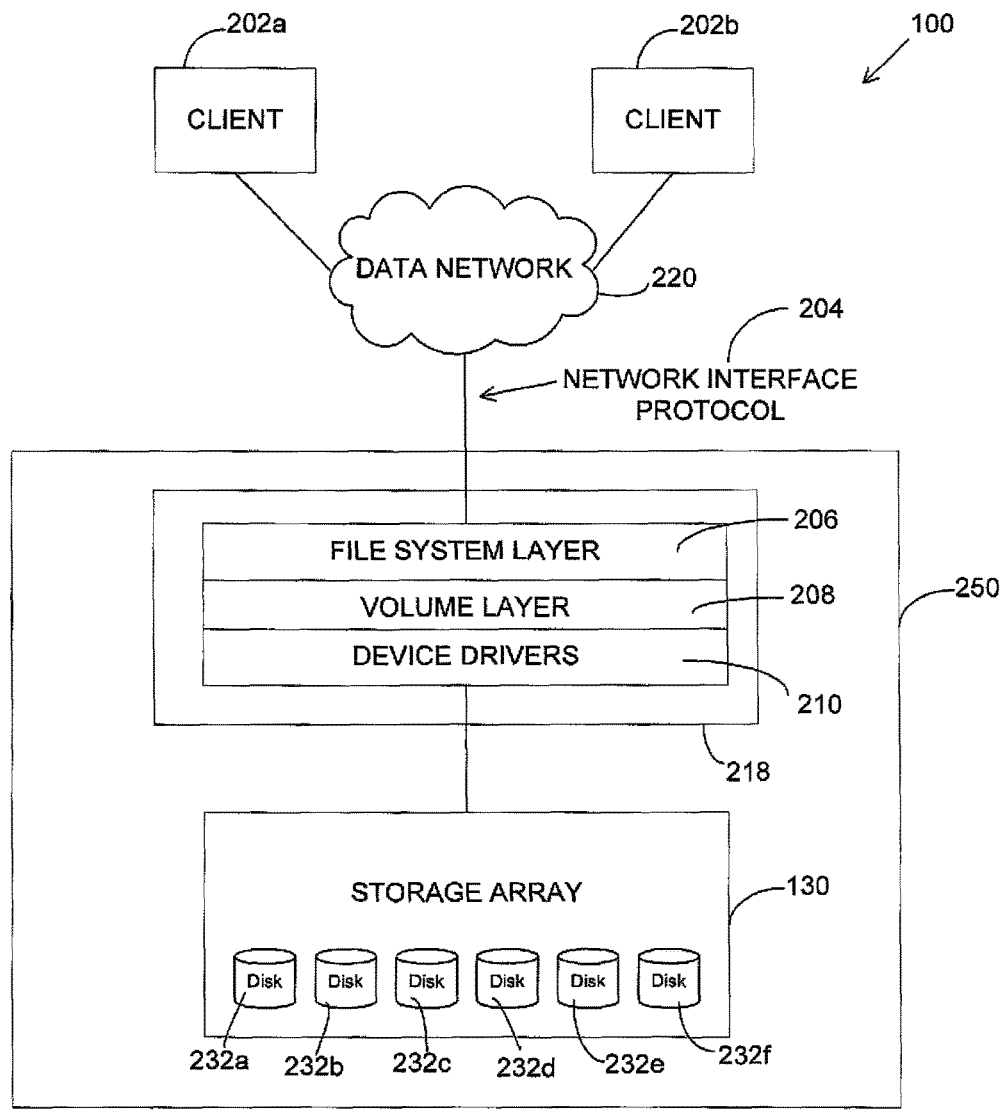
FIG. 2 is a block diagram of a computer system comprising a storage system on which embodiments of the present invention may be implemented.

In accordance with some embodiments of the present invention, the mapping layer 120 may be a file system integrated with the storage system 130 to provide a network attached storage (NAS) system as shown in FIG. 2. In the computer system of FIG. 2, client systems 202a and 202b (each of which may execute one or more application programs like application program 110 in FIG. 1) are connected to a file sever 218 via a data network 220 which may be any suitable network. The file server 218 includes a file system 206 that organizes data into a hierarchical structure of files and directories and presents a file system interface that enables the clients 202a and 202b to share access to files maintained by the file system. The file system 206 is one example of the mapping layer 120 shown in FIG. 1. The clients 202a and 202b can communicate with the file server 218 using any suitable protocol, such as NFS or CIFS. The file system server 218 further comprises a volume layer 208 for organizing storage space into logical volumes of data blocks, and device drivers 210 that provide for coupling between the file system server 218 and a storage array 130. The storage array 130 contains multiple physical storage disk 232a-232f on which data is stored. The file system server 118 and the storage array 130 may be considered jointly as a NAS system 250. In this respect, it should be appreciated that information is ultimately stored on one or more physical disks in the storage array 130, but the interface presented for accessing information on the storage system 250 is a file system interface presented by the file system server 118.

It should be appreciated that computer systems employing file systems and storage arrays (or other types of mapping layers and storage systems) can take any of numerous forms, and are not limited to the specific configuration shown in FIG. 2. For example, while two clients 202a and 202b are shown, it should be appreciated that computer systems can be employed with any number of client systems, from a single client to hundreds or thousands of clients. Similarly, while a single NAS system 250 is shown in the illustrative computer system of FIG. 2, it should be appreciated that some computer systems can incorporate multiple NAS systems that may implement one distributed file system or multiple separate file systems. Similarly, while a single storage system 130 is shown in FIGS. 1 and 2, it should be appreciated that any suitable number or types of storage systems can be employed, including storage systems that use other types of storage media rather than disk drives. Furthermore, it should be appreciated that any suitable communication protocol can be employed between the clients 202a and 202b and the file system server 218, as the protocols described above are mentioned merely for illustrative purposes. In addition, while the file system server 218 in FIG. 2 includes a number of discrete layers and drivers, it should be appreciated that the aspects of the present invention described herein are not limited to use with a computer system including a file system server configured in the specific manner disclosed. As merely one alternative example, while the file system server 218 in FIG. 2 employs a volume layer 208 to provide increased control and flexibility in terms of managing any volumes of storage presented by the storage array 130 (including logical unit numbers or LUNs), it should be appreciated that the aspects of the present invention described herein can be employed with file system servers that do not provide such a capability.

Examples of a NAS system 250 of the type shown in FIG. 2 are any of the network-attached storage (NAS) systems in the family of Celerra file server products available form EMC Corporation, and examples of a storage system 130 includes any of the CLARiiON storage systems or the SYMMETRIX storage systems, each also available from EMC Corporation. However, it should be appreciated that these are merely examples, and although the aspects of the present invention described herein are employed with a NAS system configured in a particular way, they may be employed with any type of NAS system. Similarly, as discussed above, the aspects of the present invention described herein are not limited to use with a NAS system, and can be used in connection with any computer system in which one or more mapping layers make available a plurality of logical storage objects to at least one client application and employ a storage system of any type on which the data in the logical storage objects are stored in one or more data units.

Figure 3:
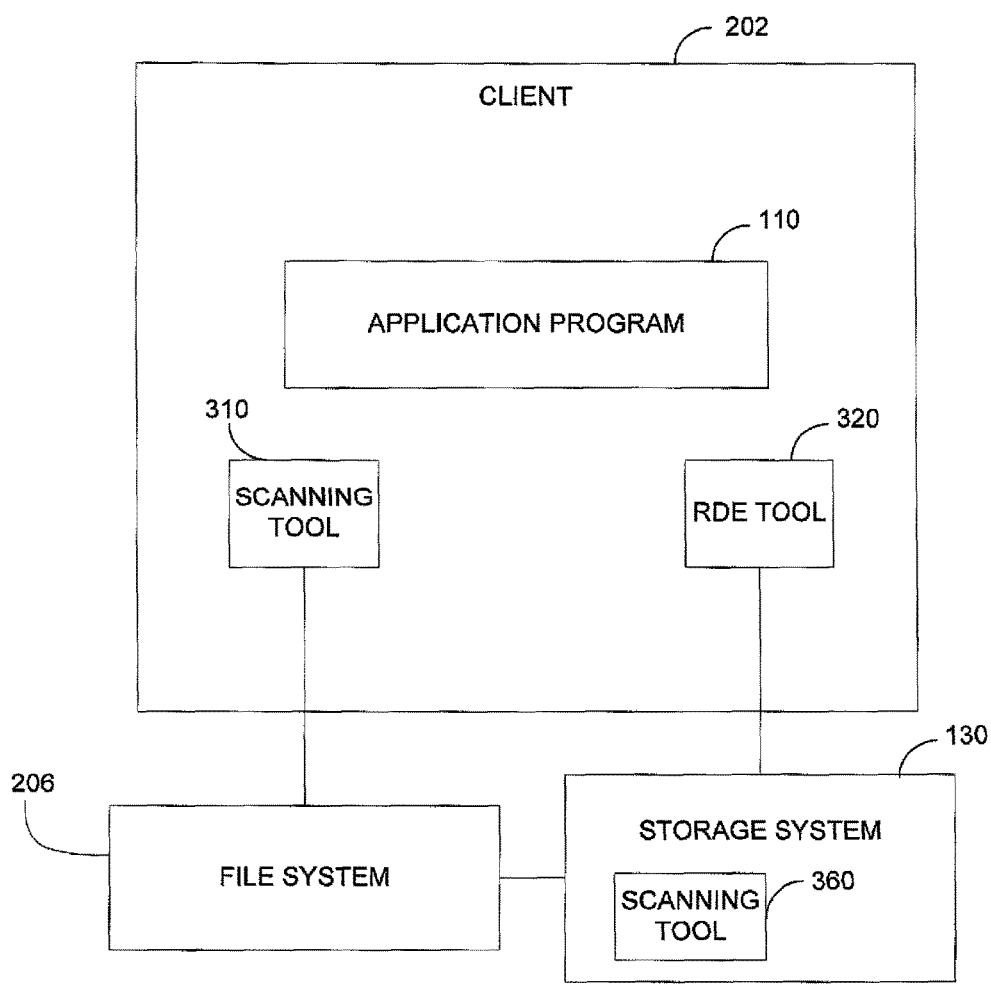
FIG. 3 is a block diagram of a computer system on which embodiments of the present invention may be implemented, including a client with a scanning tool and an RDE tool.

As mentioned above, each of the clients (202a, 202b) may comprise one or more application programs such as application program 110 as shown in FIG. 3. Application program 110 may execute on a client system and access (e.g. read and write) storage objects (e.g., files) presented by the file system 206.

The computer system of FIG. 3 includes a scanning tool 310 for searching the contents of the storage system 130 to which the one or more client systems 202 are connected to identify storage objects of interest. The scanning tool 310 can execute on any component or multiple components in the computer system (e.g., on one or more clients, a file system server, a storage system, a dedicated appliance, etc.) as the aspects of the present invention described herein are not limited to use with a scanning tool that is implemented on any particular computer system component.

In some embodiments illustrated in FIG. 3, the scanning tool 310 may be an application executing on a client 202, and the scanning tool 310 may provide one or more "value-add" services to the client. As discussed above, the aspects of the present invention described herein can be used with scanning tools of any suitable type that can perform any of numerous types of scanning operations, non-limiting examples of which include anti-virus processing, keyword-based file classification and security audits, discovery of files with a shared provenance, etc. According to various implementations of such embodiments, the scanning tool 310 may act at the file system level (or on the storage objects presented by other types of mapping layers). That is, the scanning tool 310 may interact directly with files (or other storage objects) presented by the file system 206 (or other types of mapping layers).

A typical file system creates and maintains metadata for each file in the file system. The metadata about a file typically includes pointers to one or more data units (e.g., data blocks in the storage system 130 that store the data for the file). A typical scanning tool 310 accesses the metadata for each file and may use the metadata to determine which data blocks should be scanned for the file. The identified data blocks corresponding to each file in the file system may then be processed by the scanning tool 310 to provide whatever type of scanning the tool implements (e.g., anti-virus processing). In a full scan of the file system, the aforementioned process may be repeated for each file in the file system. Accordingly, in a conventional scanning system, data units that are shared by multiple files are scanned multiple times (i.e., once for each representation in the file system that shares the data unit).

As mentioned above, other scanning tools 360 may be implemented on a NAS system 250 (FIG. 2) or on a storage system 130 (FIG. 3). In such embodiments, the scanning tool may be configured to periodically scan the NAS system 250 or storage system 130 for any of numerous reasons (e.g., to determine if there are any data units stored on the storage system which appear as abnormal and that may cause an instability in at least a portion of the storage system if not attended to). A scanning tool implemented as part of the NAS system 250 or storage system 130 may act directly on data units stored on the storage array (e.g., rather than operating on storage objects at the file system level). Such scanning tools 360 may be configurable and may be monitored by, for example, an administrator of the NAS system 250 or storage system 130.

The computer system 100 on which some aspects of the invention may be implemented may additionally comprise a redundant data elimination (RDE) tool for efficiently managing data stored on a storage system. The RDE tool may be of any numerous types, as the aspects of the present invention described herein are not limited to use with any particular type of RDE tool. As described above, some RDE tools identify multiple data units in a storage system that are identical and eliminate one or more copies of such redundant data units, resulting in one or more data units in the storage system that are shared by multiple storage objects.

Redundant data units may comprise fixed or variable size data blocks, and may comprise isolated data blocks or all of the data blocks in a file in a file system (e.g., when multiple copes of a file are saved on the storage system). In some RDE tools, redundant data may be identified by examining hash signatures of data units stored on the storage system. However, the aspects of the invention described herein are not limited to the exact manner by which redundant data is identified, eliminated, and stored on the storage system, and embodiments may be used with RDE tools of any type. In one implementation, the RDE tool may be an RDE tool 320 (FIG. 3) which is an application which executes on a client system connected to storage system 250. Alternatively, the RDE tool may be implemented on a storage system (e.g., NAS system 250 or storage system 130) so that operations of the RDE tool are transparent to the client system accessing the data. For example, although an RDE tool 320 may detect and consolidate redundant data units stored on the storage system 130, the file system view presented to a user of a client system remains unchanged. Such transparency allows the user to interact with files on the file system in the same way, without being concerned with how the physical data units are actually stored on the storage system 130.

In accordance with one embodiment of the present invention, information about data units that are shared among multiple storage objects as a result of processing by an RDE tool is made available to one or more scanning tools so that the one or more scanning tools can use the information to influence a scanning operation in various ways, examples of which are discussed below. The aspects of the present invention described herein are not limited to any particular technique by which the information identifying shared data units is provided to the scanning tool(s), as any suitable technique (examples of which are discussed below) may be employed. Similarly, the information relating to shared data units can be provided in any suitable form (examples of which are discussed below) as the aspects of the present invention are not limited in this respect.

Figure 4:
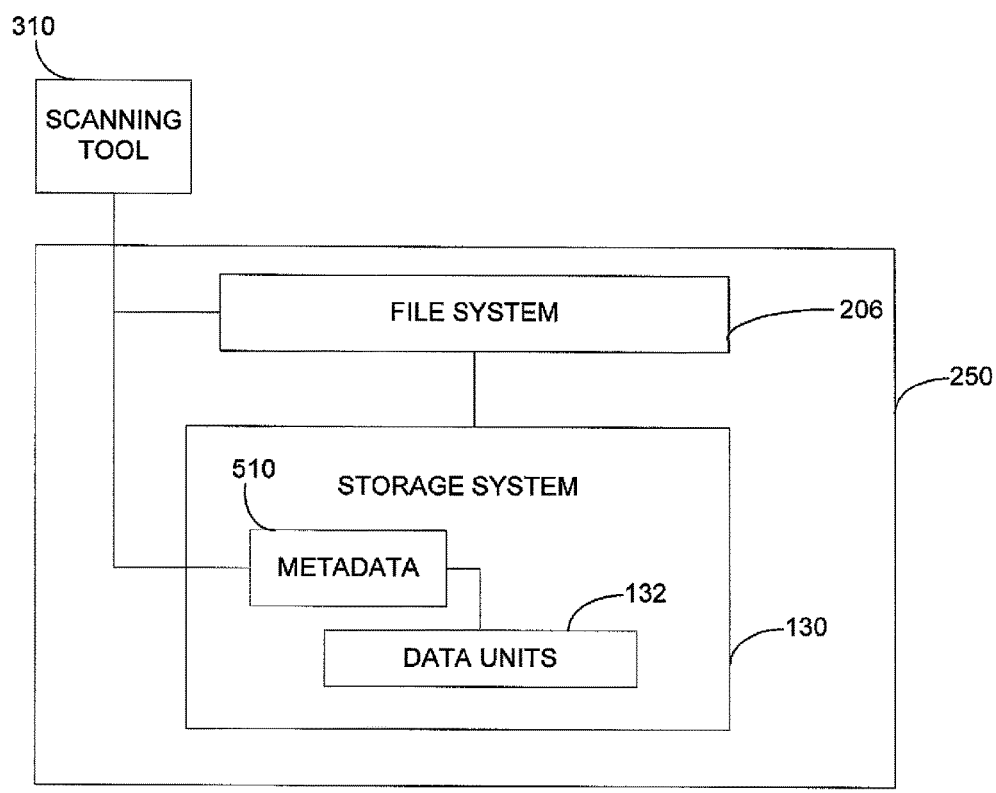
FIG. 4 shows an organization of data units in a storage array on which embodiments of the present invention may be implemented.

In the embodiment illustrated in FIG. 4, the information relating to data units shared by one or more storage objects (e.g., files) is maintained in metadata 510 stored on a storage system 130. However, it should be appreciated that the aspects of the present invention described herein are not limited in this respect, as the information relating to shared data units can be stored in any form at any suitable location or at distributed locations in the computer system.

The information relating to shared data units can be generated and maintained by any suitable component or components in the computer system. For example, in accordance with one embodiment of the present information, the information (e.g., metadata 510) can be created and managed by the RDE tool and/or the mapping layer (e.g., file system 206) that manages the storage object. Some examples of ways in which the information can be created and maintained are provided below.

Regardless of how the information identifying shared data units is created or maintained (e.g., regardless of whether such shared data units are segregated in the manner in which they are stored on the storage system), the information can be made available to the scanning tool and used thereby in any of numerous ways, as the aspects of the present invention described herein are not limited to any particular implementation techniques in this regard.

As discussed above, many scanning tools operate at a level above the mapping layer (e.g., above the file system). For example, the scanning tool(s) 310 in FIG. 4 may perform a scan of the data within the file system 206 by issuing requests to the file system to provide the underlying data within the files for the scanning tool(s) 310 to operate on. For example, when seeking to perform a scanning operation on a file A, the scanning tool 310 may issue a read to the file system 206 requesting file A and perform a scan operation on the underlying data for file A received from the file system 206.

In terms of one embodiment of the present invention, to achieve increased efficiency in performing scanning operations, the scanning tool 310 is presented with information relating to shared data units so that shared data units need not be scanned multiple times. This can be achieved in any of numerous ways. It should be appreciated that conventional scanning tools that operate above a mapping layer such as a file system 206 have no visibility to or knowledge of the underlying data units in the storage system 130 that resides below the file system 206. In accordance with one or more implementations, the scanning tool 310 is provided with at least some information about the underlying data units 132 to facilitate improved scanning. Once again, this can be achieved in any of numerous ways.

In accordance with one illustrative embodiment of the present invention, the order in which data units are scanned is impacted by which data units are shared by multiple storage objects. For example, in accordance with one embodiment of the present invention, priority may be given to scanning data units that are shared before scanning data units that are not. Assigning priority to shared data units may provide an advantage when the scan is used from the level above the mapping layer. For example, if ten files were essentially identical copies and shared underlying data blocks, a scan of the underlying data blocks would essentially accomplish a scan of ten files in the file system as opposed to performing a scan of a file having no shared data blocks, which would result in a scan of simply one file. Thus, in accordance with one embodiment of the present invention, priority is given to scanning shared data blocks before unshared data blocks.

Priority can be given to shared data blocks in the scanning operation in any of numerous ways, as the aspects of the present invention are not limited in this respect. For example, in accordance with one embodiment of the present invention, all of the shared data blocks may be scanned before any of the unshared data blocks, but it should be appreciated that the aspect of the present invention that relates to providing priority to shared data blocks is not limited in this respect, and that some intermingling of scanning shared and unshared data blocks can be performed, but with heavier weighting being given to shared data blocks earlier in the scanning operation.

In accordance with one embodiment of the present invention, an additional level of prioritization is given to shared data blocks, with data blocks that are shared by a higher number of storage objects being given priority over those shared by a fewer number of storage objects for reasons similar to those discussed above. In the embodiments where priority is given to shared data units in a scanning operation, some information may be provided to the scanning tool 310 to enable the scanning tool to recognize how to implement the prioritization in a scanning operation. For example, for an embodiment wherein priority is given to all shared data units equally over unshared data units, the scanning tool may be provided with information that identifies the shared (or alternatively unshared) data units and/or the storage objects to which they correspond. In this respect, if the scanning tool 310 operates above the level of the mapping layer (e.g., the file system 206), the scanning tool 310 may have no visibility to the underlying data units 132 and have no ability to access them directly. Thus, in accordance with one implementation, such a scanning tool 310 is provided with information that identifies the storage objects (e.g., files) that include shared data blocks and may prioritize the scanning of those storage objects over other storage objects that do not include a shared data unit. In accordance with one illustrative embodiment of the present invention, in addition to identifying the storage objects that include shared data units, the information provided to the scanning tool 310 may also identify which data units within those storage objects are shared among them, so that the scanning tool 310 can avoid scanning the same data block multiple times. This can be accomplished in any suitable manner, with several illustrative techniques described below.

Figure 5:
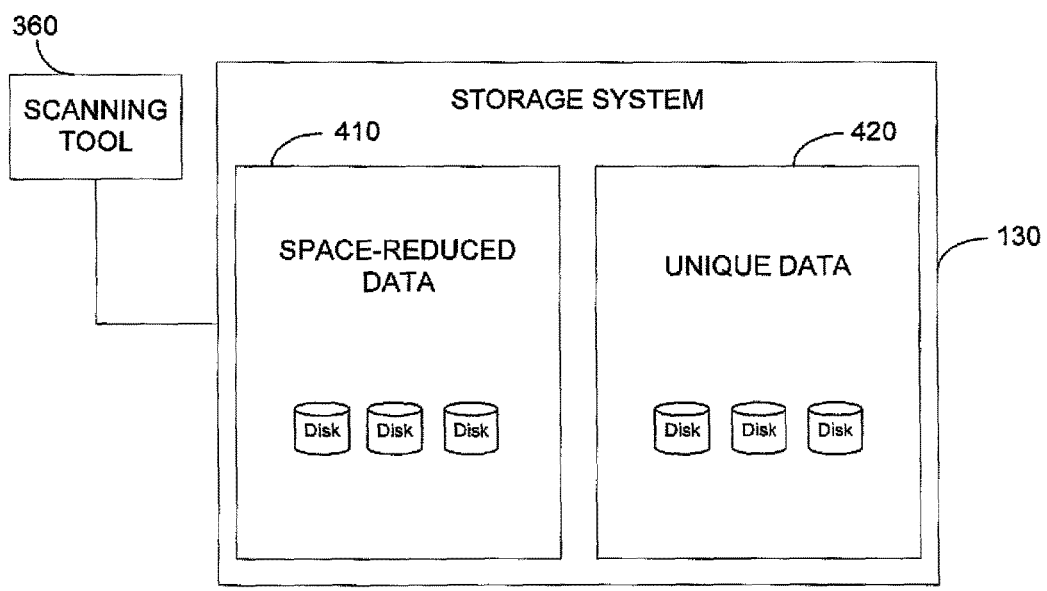
FIG. 5 shows a storage array comprising metadata provided to a scanning tool according to some embodiments of the present invention.

In one implementation illustrated in FIG. 5, data units that have been space reduced by RDE tool 320 may be stored in a first portion 410 of storage system 130, and data units that have not been space reduced (i.e., data units that are unique to the storage system) may be stored in a second portion 420 of storage system 130. Information about the organization of data units in the storage system 130 may be made available to scanning tool 130, thereby affecting the way in which the scanning tool 130 scans the data. For example, shared data units that have been reduced to a single instance in the first portion 410 of storage system 130, may be scanned only once (c.f., scanning shared data units multiple times with conventional scanning). Data units in the second portion 420 of the storage system 130 may be scanned using conventional scanning procedures as each of the data units therein is unique (i.e., not shared among multiple storage objects). By scanning shared data units only once, an improved scanning system according to various embodiments of the present invention results in an acceleration of the identification of storage objects which match particular search criteria, and reduces the amount of storage system I/O by scanning less than the totality of data as viewed from the file system perspective.

Figure 6:
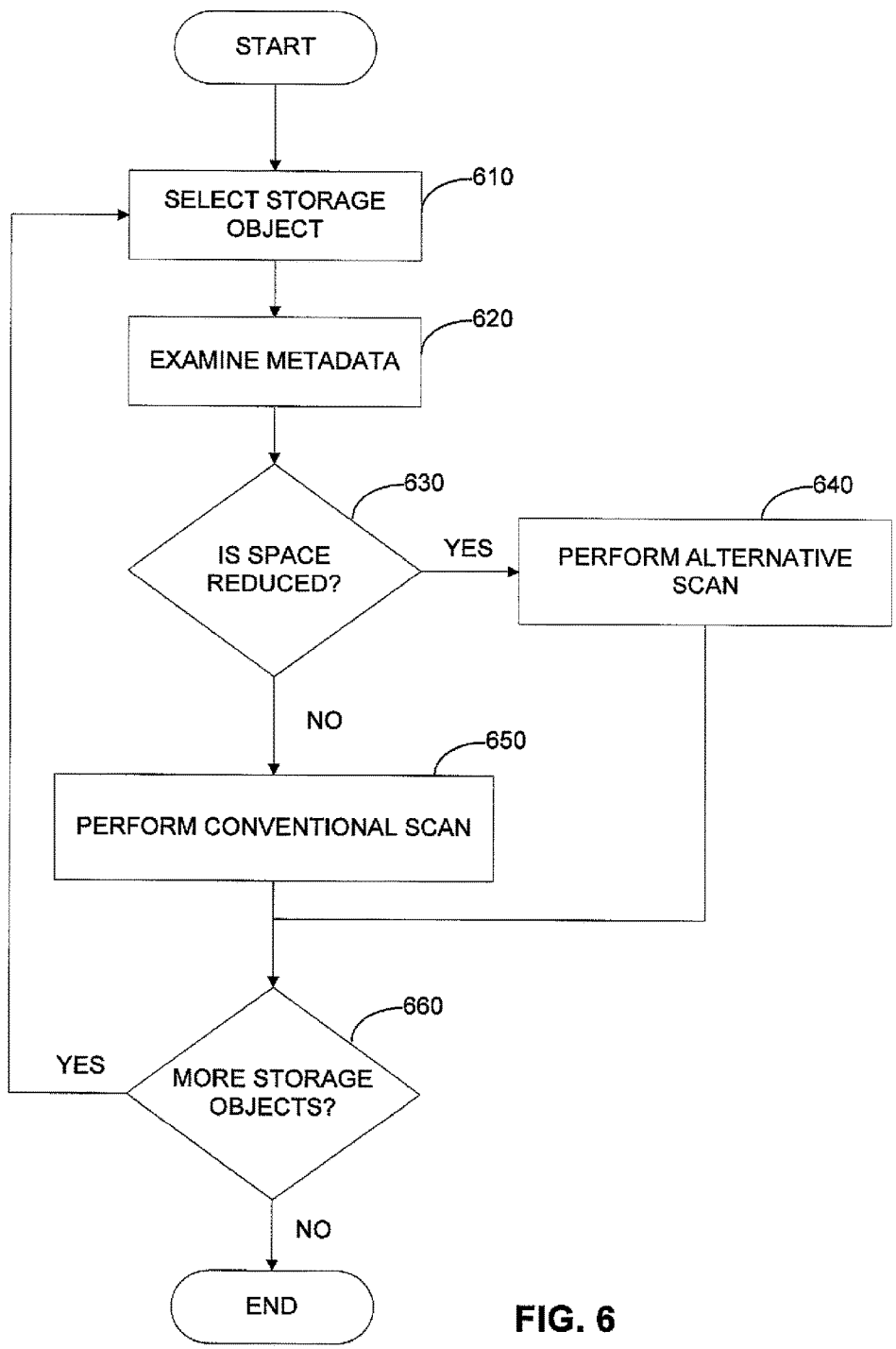
FIG. 6 is a flow chart illustrating an example of using the metadata of FIG. 5 to inform a scanning operation in accordance with one embodiment of the invention.

An exemplary method of scanning data in a storage system according to some embodiments of the invention is shown in FIG. 6. In act 610, a storage object is selected for scanning. The storage object may be selected in any suitable manner, as the aspects of the present invention as described herein are not limited to any particular selection technique. As discussed above, in accordance with one embodiment of the present invention, the selection of the storage object may be based upon the number of shared data units in the storage object to prioritize scanning of shared data units, although all embodiments of the present invention are not limited in this respect.

If the scanning tool 310 is acting at the mapping layer (e.g. file system) level (e.g., as shown in FIG. 3), the storage object selected in act 610 may be a file in the file system. Alternatively, if the scanning tool 360 is acting at the storage system level (e.g., as shown in FIG. 5), rather than selecting a storage object, a data unit (e.g., a data block) may be selected.

In act 620, metadata associated with the selected storage object may be examined by the scanning tool 310 to determine (in act 630) if at least a portion of the storage object has been space reduced by an RDE tool 320. As discussed above, this determination can be made in any suitable manner examining any suitable metadata, as the aspects of the present invention described herein are not limited to any particular technique for determining whether any portion of the storage object has been spaced reduced.

If it is determined in act 630 that at least a portion of the storage object has been space reduced, the process proceeds, to act 640 where an alternative scanning procedure, described in more detail below, may be performed. However, if no portion of the storage object has been space reduced, the scanning tool performs a conventional scan of the storage object's contents in act 650. If it is determined in act 660 that there are more storage objects to scan, the process returns to act 610 to select another storage object. Otherwise if the entire storage system scan is complete, the process terminates.

The determination in act 660 of whether there are more storage objects (or alternatively data units where a scanning tool operates at the storage system level) can be performed in any suitable manner, as the aspects of the present invention as described herein are not limited in this respect. For example, when a scan is being performed of an entire file system, a determination can be made in act 660 whether any files remain to be scanned, but it should be appreciated that this is merely one example, and that other techniques can be employed.

Figure 7:
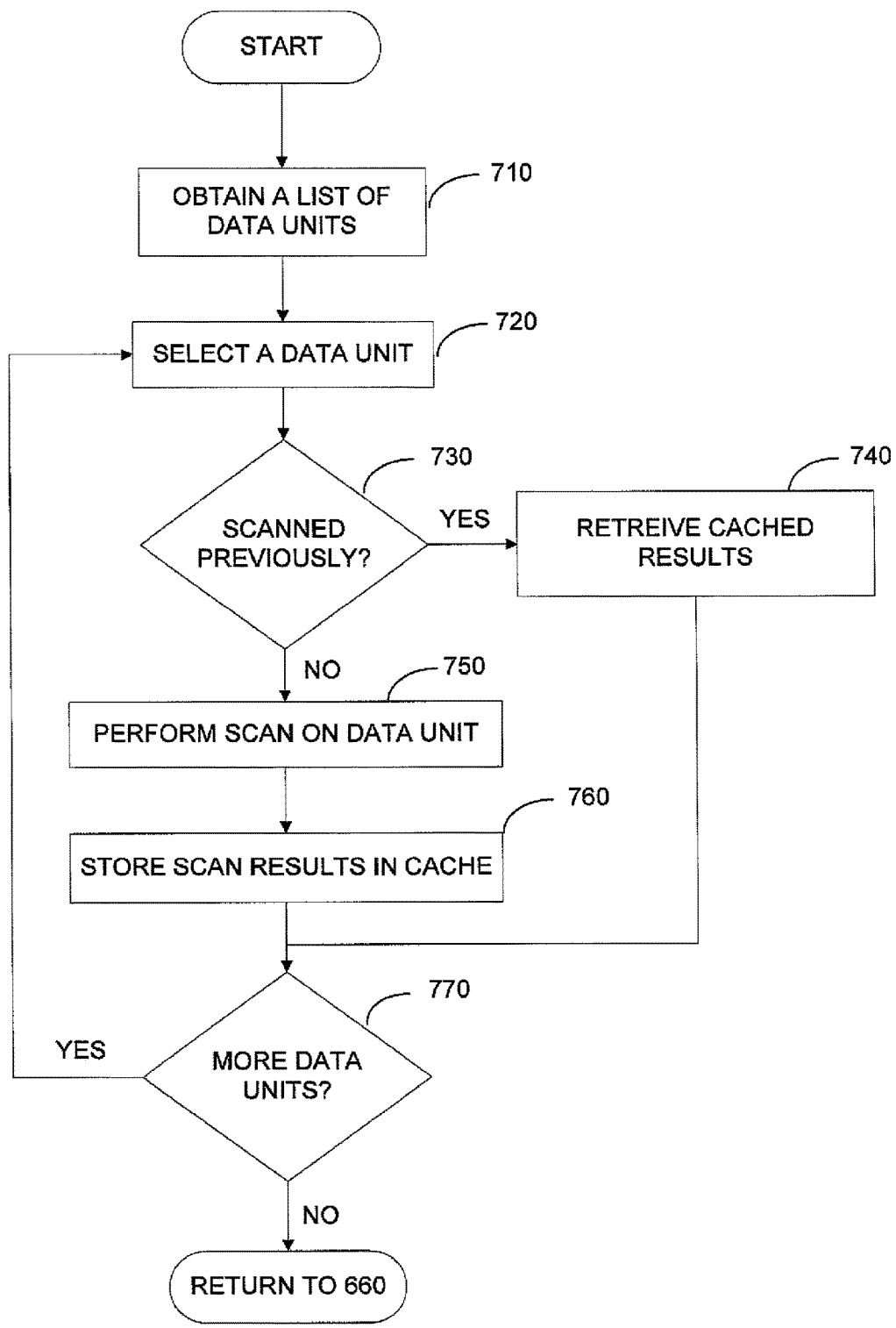
FIG. 7 is a flow chart illustrating an example of performing a scan of space reduced data by caching results from previous scans in accordance with another embodiment of the invention.

One implementation of the alternative scanning procedure referenced in act 640 according to some embodiments of the invention is illustrated in FIG. 7. After it has been determined that a storage object contains at least some data that has been operated upon by an RDE tool (e.g., a data unit shared with one or more other storage objects), a list of data units for the storage object may be obtained in act 710. The data units may be, for example, equal size (e.g., 8K) data blocks, and the list of data units can be obtained in any suitable manner, as the aspects of the present invention are not limited in these respects. As discussed above, in accordance with one embodiment of the present invention, metadata identifying the data units for a storage object may be provided to the scanning tool by the mapping layer that maintains the metadata (e.g., the file system 206).

In act 720, one of the data units in the storage object is selected for processing. The selection can be performed in any of numerous ways, as aspects of the present invention described herein are not limited in this respect. As discussed above, in accordance with some embodiments, priority is given in the scanning order to data units that are shared by multiple storage objects. In accordance with that embodiment, the act 720 of selecting a data unit may consider information identifying a number of storage objects that share each of the data units in making the selection process as discussed above, but it should be appreciated that not all aspects of the present invention are limited in this respect and that any other suitable process may be employed for selecting a data unit for processing in act 720.

In act 730, it may be determined if the selected data unit was scanned previously. This may be accomplished in one embodiment, for example, by hashing the contents of the data unit, and comparing the hash signature of the data unit with identifiers of previously scanned data units stored in a cache. Although hashing the contents of a data unit is one exemplary method of determining a unique identifier for a data unit, it should be appreciated that a unique identifier may be obtained in any suitable manner, as embodiments of the present invention are not limited in this respect.

If the data unit was previously scanned, the cached scan results for the data unit are returned in act 740. For example, a unique identifier used by the mapping layer in identifying the data block may alternatively be stored in the cache to identify the data block, and a comparison of those identifiers can be performed. The nature of the cached results retrieved in the act 740 can take any of numerous forms, as the aspects of the present invention described herein are not limited in this respect. For example, in accordance with one embodiment of the present invention, the scanning tool may perform operations and/or provide reports on the results of the scanning operation for each storage object (e.g., file) scanned. The particular reporting and/or operation performed depends upon the specific nature of the scanning tool, and is not a limitation of the aspects of the present invention described herein. However, in accordance with one embodiment of the present invention, the scanning results for a data unit previously scanned are retrieved in act 740 so that at the conclusion of the process illustrated in FIG. 7, the scanning tool has scanned results for each data unit in the storage object, whether from performing a new scanning operation or from retrieving results from a previous scan.

When it is determined in the act 730 that the selected data unit was not previously scanned, the process proceeds to act 750, wherein a scan is performed on the data unit. In accordance with one embodiment of the present invention, after a scan is performed on the data unit in act 750, the process proceeds to act 760, wherein the scan results are stored in a cache. Storing the scan results in a cache makes them available for future use in the event that the scanned data unit is shared by other storage objects. In accordance with one embodiment of the present invention, a determination is made as to whether the data is shared by other storage objects (using any of the illustrative techniques described above) and the scan results are stored only for data units that are determined to be shared by other storage objects to minimize the storage medium resources used to implement the cache. However, it should be appreciated that all aspects of the present invention are not limited in this respect, and that all scan results may alternatively be stored without performing a check to determine whether a data unit is shared by multiple storage objects.

The process illustrated in FIG. 7 then proceeds to act 770, wherein a determination is made as to whether the selected storage object has any additional data units to be processed. If so, the process returns to act 720, wherein a next data unit is selected for processing using any of the illustrative techniques discussed above (e.g., optionally providing priority to a data unit shared by other storage objects, and in some embodiments giving preference to data units shared by the largest number of storage objects). When it is determined in act 770 that there are no additional data units for the storage object to be scanned, the processing of the currently selected storage object is completed, and the process returns to act 660 in FIG. 6 to determine if there are additional storage objects to be scanned.

The storage resources used to store and retrieve scanned results can be implemented in any suitable manner, as the aspects of the present invention described herein are not limited in this respect. In the description above, the storage resources are referred to as a cache, but it should be appreciated that any storage medium can be employed, including storage techniques that may not conventionally be referred to as a cache. In computer systems that employ multiple scanning tools that perform different types of scanning operations, separate caches or other storage mediums can be employed for each of the scanning tools in accordance with one embodiment of the present invention. Alternatively, a single cache or other storage medium can be employed for multiple scanning tools in accordance with an alternate embodiment of the invention. When the same storage resources are used for multiple scanning tools, in addition to providing some unique identifier for the data unit entries in the storage medium, some information can be used to identify the scanning tool that performed the scanning operation on the data unit to generate the particular results and an entry in the storage medium, so that when a scanning tool retrieves results from the storage medium, the scanning tool retrieves results based upon the type of scanning operation it performs.

In accordance with one embodiment of the present invention, techniques can be employed to manage or limit the amount of storage resources dedicated to storing scanned results. In this respect, if limited storage resources are available, techniques can be employed to manage those resources and replace previous entries with new restored ones in any suitable manner, including any of the types of techniques employed for cache management. In this respect, it should be appreciated that if previously stored scanning results are removed from the cache or other memory resource, it will have no negative impact on the accuracy of the scanning operation, as the scanning operation can simply be informed that the previous results have been discarded and the scanning operation can regenerate them by performing a new scan on the data unit.

As discussed above, it should be appreciated that the various components of the computer system, including one or more scanning tools, one or more mapping layers, and one or more RDE tools can each be a separate component in the computer system. When each of these components is discrete and separate from the others, application programming interfaces (APIs) may be developed for enabling communication between the components in any of the ways discussed above (e.g., to pass information to the scanning tool about data units that are shared by multiple storage objects). In an alternate embodiment of the invention, two or more of these components may be integrated into a single large component. For example, the mapping layer (e.g., a file system) may have a scanning tool and/or or RDE tool component integrated into it. In such an embodiment, programming interfaces may still be provided to allow for the exchange of information among these functional components, although they may be integrated into a single larger component.

As discussed above, some scanning tools may operate at the storage system level by operating directly on data units (e.g., data blocks) to identify one or more data units of interest (e.g., a data unit comprising a known pattern of a virus). In one embodiment, after the data units of interest have been identified by a scanning tool operating at the storage system level, some or all of the storage objects which share the data units of interest may be identified. For example, it may be more informative to a user or administrator of a system to identify by name one or more files that include a block of interest (e.g., an infected block) rather than identifying the data block directly. As described above, this can be implemented in any suitable manner, and the aspects of the present invention are not limited in this respect.

Figure 8:
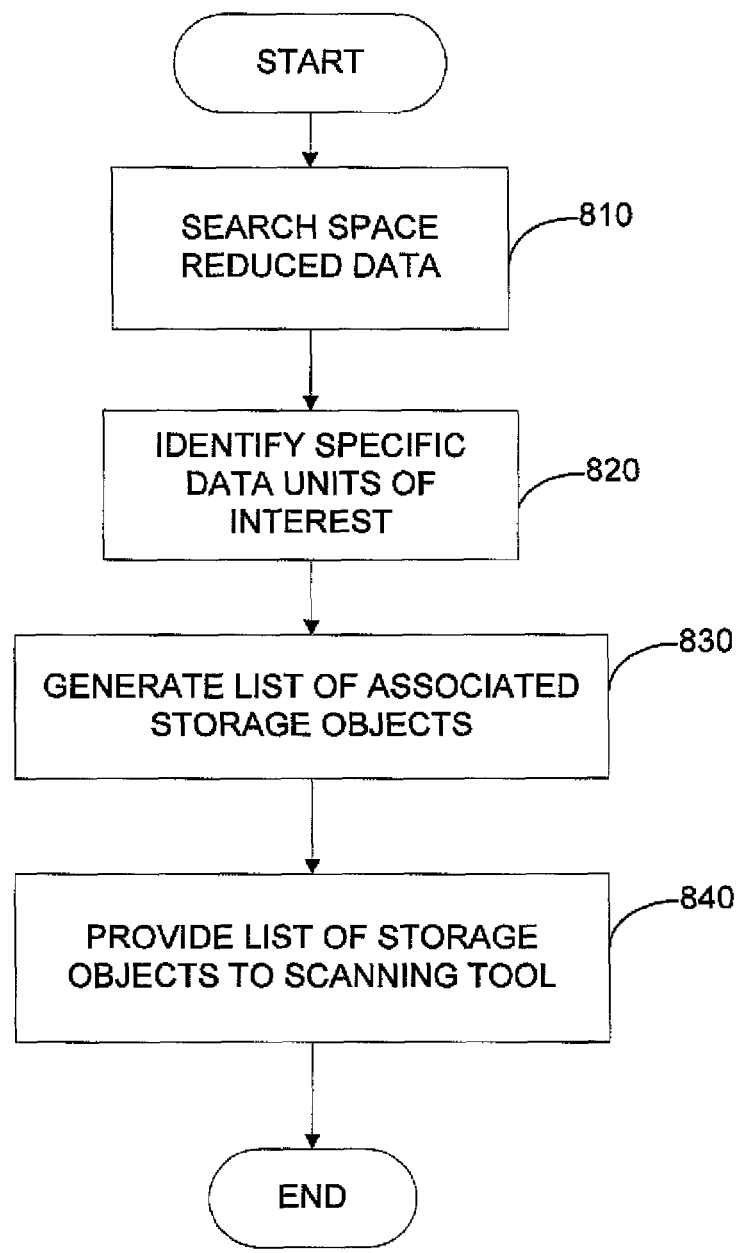
FIG. 8 is a flow chart illustrating one example of prioritizing scanning of storage objects based on redundant data contents in accordance with one embodiment of the invention.

An exemplary implementation of a method for scanning at the storage system level followed by reporting the results at the mapping level is illustrated in FIG. 8. As with previous embodiments, in one aspect, data units that are shared among multiple storage objects may be scanned before data units that are not shared, although the aspects of the present invention are not limited in this respect, and the data units may be scanned in any order by any scanning tool.

In the implementation of FIG. 8, shared data units may be scanned by a scanning tool operating at the storage system level on data units (e.g., data blocks) in act 810. As a result of the scan performed in act 810, a subset of data units on the storage system are identified as containing one or more data units of interest in act 820. The data units of interest may be identified in any suitable way. For example, the scanning tool operating at the storage system level may search within data units for a known pattern of a virus, although it should be appreciated that searching for a virus is only one example of data of interest that may reside in one or more data units stored on the storage system.

Upon identifying data units of interest in act 820, a list of storage objects (e.g., files) associated with the identified data units of interest may be produced in act 830 in any suitable way. For example, in one aspect, metadata stored on the storage system (or alternatively stored somewhere else in the computer system) and associated with the mapping between the data units and the storage objects which contain them. For example, where the mapping layer provides an interface (e.g., an application programming interface or API) that enables it to be queried by providing a data unit (e.g., a data block) and returns the storage object(s) (e.g., files(s)) that include the data unit, such an interface can be employed.

The list of storage objects identifying the data units may be provided to one or more scanning tools 310 operating above the mapping layer (e.g., file system) in act 840 in any suitable way. After receiving at least a portion of the list of storage objects to be scanned, in one embodiment, the scanning tool may simply present the results of the scanning operation by reporting (in any suitable manner) which storage objects have data of interest. In this manner, the scanning tool can be considered to operate above the mapping layer in that it reports results on the storage objects presented by the mapping layer, but the actual scanning is performed by scanning at the lower data unit level. In an alternate embodiment, the one or more scanning tools may perform additional scanning on the identified data units and/or storage objects. In this embodiment, by providing information to the scanning tool 310 to allow for the scanning of only a subset of the storage objects in the file system, the time required for the scanning tool to scan a storage system to provide a particular value-add process is reduced, in that only storage objects which contain at least one identified data unit of interest need to be scanned.

Aspects of the invention, including embodiments described above, can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of embodiments in accordance with aspects of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention. It should be appreciated that in accordance with several embodiments of the present invention wherein processes are implemented in a computer readable medium, the computer implemented processes may, during the course of their execution, receive input manually (e.g., from a user).

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for use in a computer system comprising at least one mapping layer that makes available a plurality of storage objects, and a storage system that stores data in each of the plurality of storage objects in one or more data blocks, the method comprising:

reducing space usage on the storage system, using a redundant data elimination tool, of at least some redundant data by sharing at least one of the data blocks among multiple storage objects;

generating information about the at least one of the data blocks shared among multiple storage objects, wherein the information identifies the storage objects that include shared data blocks;

assigning to the plurality of storage objects a scanning priority based at least in part on the information about the at least one of the data blocks shared among multiple storage objects, wherein a higher scanning priority is assigned for storage objects having redundant data blocks shared among multiple storage objects over storage objects that do not include a shared data block; and performing, using at least one scanning tool, at least one scanning operation on at least some of the plurality of storage objects wherein ones of the storage objects having a higher scanning priority are scanned prior to ones of the objects having a lower scanning priority.

2. The method of claim 1, further comprising:

receiving the information about the at least one of the data blocks shared among multiple storage objects at the at least one scanning tool.

3. The method of claim 1, wherein the information is used by the at least one scanning tool to reduce scanning of data blocks shared by multiple storage objects.

4. The method of claim 1, wherein the information is used to assign a higher priority to storage objects containing data blocks that are shared among multiple storage objects.

5. The method of claim 1, further comprising:
providing the information about the at least one of the data blocks shared among multiple storage objects to the at least one scanning tool.

6. The method of claim 5, wherein the at least one mapping layer provides the information to the at least one scanning tool.

7. The method of claim 6, wherein the at least one mapping layer comprises a file system.

8. At least one non-transitory computer readable medium encoded with a plurality of instructions that, when executed, perform a method for use in a computer system comprising at least one mapping layer that makes available a plurality of storage objects, and a storage system that stores data in each of the plurality of storage objects in one or more data blocks, the method comprising:
reducing space usage on the storage system, using a redundant data elimination tool, of at least some redundant data by sharing at least one of the data blocks among multiple storage objects;
generating information about the at least one of the data blocks shared among multiple storage objects, wherein the information identifies the storage objects that include shared data blocks;
assigning to the plurality of storage objects a scanning priority based at least in part on the information about the at least one of the data blocks shared among multiple storage objects, wherein a higher scanning priority is assigned for storage objects having redundant data blocks shared among multiple storage objects over storage objects that do not include a shared data block; and
performing, using at least one scanning tool, at least one scanning operation on at least some of the plurality of storage objects wherein ones of the storage objects having a higher scanning priority are scanned prior to ones of the objects having a lower scanning priority.

9. The at least one computer readable medium of claim 8, wherein the method further comprises:
receiving the information about the at least one of the data blocks shared among multiple storage objects at the at least one scanning tool.

10. The at least one computer readable medium of claim 9, wherein the information is used by the at least one scanning tool to reduce scanning of data blocks shared by multiple storage objects.

11. The at least one computer readable medium of claim 9, wherein the information is used to assign a higher priority to storage objects containing data blocks that are shared among multiple storage objects.

12. The at least one computer readable medium of claim 8, wherein the at least one mapping layer provides the information about the at least one of the data blocks shared among multiple storage objects to the at least one scanning tool, and wherein the at least one mapping layer is a file system.

13. At least one computer system, comprising:
at least one mapping layer that makes available a plurality of storage objects;
a storage system that stores data in each of the plurality of storage objects in one or more data blocks;
at least one scanning tool that performs at least one scanning operation on at least some of the plurality of storage objects;
at least one redundant data elimination tool, different from the at least one scanning tool, that reduces space usage on the storage system of at least some redundant data by sharing at least one of the data blocks among multiple storage objects; and
at least one processor programmed to:
generate information about the at least one of the data blocks shared among multiple storage objects, wherein the information identifies the storage objects that include shared data blocks;
assign to the plurality of storage objects a scanning priority based at least in part on the information about the at least one of the data blocks shared among multiple storage objects, wherein a higher scanning priority is assigned for storage objects having redundant data blocks shared among multiple storage objects over storage objects that do not include a shared data block; and
perform, using at least one scanning tool, at least one scanning operation on at least some of the plurality of storage objects wherein ones of the storage objects having a higher scanning priority are scanned prior to ones of the objects having a lower scanning priority.

14. The at least one computer of claim 13, wherein the at least one processor is programmed to receive the information about the at least one of the data blocks shared among multiple storage objects at the at least one scanning tool.

15. The at least one computer of claim 13, wherein the at least one processor is programmed to make available the information about the at least one of the data blocks shared among multiple storage objects to the at least one scanning tool.

16. The at least one computer of claim 15, wherein the at least one mapping layer comprises a file system and the making available to the at least one scanning tool information about the at least one of the data blocks shared among multiple storage objects is performed by the file system.

* * * * *